Figure 1:
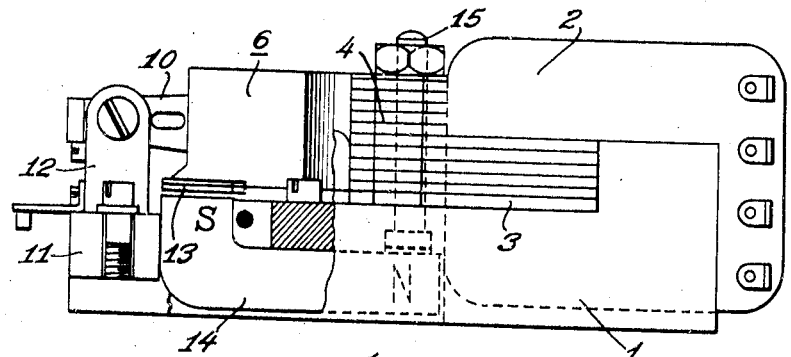

June 6, 1944.  O. RÖMER  2,350,825
POLARIZED SINGLE-COIL RELAY
Filed Feb. 6, 1941

Inventor
OTTO RÖMER
By [signature]
Attorney.

Patented June 6, 1944

2,350,825

UNITED STATES PATENT OFFICE 2,350,825

POLARIZED SINGLE-COIL RELAY

Otto Römer, Berlin-Siemensstadt, Germany; vested in the Alien Property Custodian Application February 6, 1941, Serial No. 377,720
In Germany January 13, 1940

5 Claims. (Cl. 175—339)

This invention relates to improvements in polarized single-coil relays.

A polarized single-coil relay with a divided direct current flux or a steady polarizing flux with two paths in parallel forming a closed magnetic circuit through the ends of a movable armature is well known. In such a relay one pole of the polarizing permanent magnet is arranged in the neighborhood of two pole shoes; the other pole of the permanent magnet is arranged below the center of rotation of the armature. In the known relays of this type the armature must be short and the distance between the poles of the permanent magnet must therefor be chosen accordingly small. Since the attractive force of the permanent magnet is dependent upon its dimension, a short bar magnet that would be required would not generally be sufficient for providing the permanent flux. When horse-shoe magnets are employed it is generally necessary to arrange the magnet beneath the mounting plate of the relay, and the height of the mounting frame is therefore dependent upon the height of this magnet. Inasmuch as certain parts of the relay, such as the coil, the armature and the contact arrangement are disposed above the mounting plate and only the horse-shoe magnet is placed beneath it there results a waste space beneath the mounting plate and within the mounting frame that cannot be utilized.

The distance between the poles of the permanent magnet must be kept relatively small, in view of the fact that it is arranged below the center of rotation of the armature and below the pole shoes of the alternating flux circuit, and the pole must be extended in an upward direction through the medium of the pole shoes to the plane of the armature. Such a structure presents the further disadvantage that a relatively small air gap remains between the permanent magnet and the pole shoes of the alternating flux circuit. Diversion of flux of the permanent magnet, therefore, must be taken into accounting.

The disadvantages of the known relay are eliminated in the structure according to the invention. It may also be mentioned that one object of the invention is to provide a relay of very small size.

According to the invention the permanent flux enters the soft iron circuit from a point lying on one side of the center of rotation of the armature and returns to the permanent magnet through the armature on the other side of the center of rotation thereof.

According to the invention the permanent flux is carried off from the armature in a direction perpendicular to its movement. The arrangement resulting in such circuit has the advantage that a strong permanent magnet with small diversion or leakage of flux may be mounted in the relay. In carrying off the flux according to the invention a condition hindering the movement of the armature is avoided even in the case of the smallest air gap, and the flux may, therefore, be carried off from the armature in the neighborhood of and even adjacent to the contacts.

The relay according to the invention has the further advantage that a permanent magnet of the bar type may be employed instead of a horse-shoe magnet, since the distance between the poles of the permanent magnet may be made equal to the length of the armature. However, the armature may be disposed above the mounting plate as is the case with the known relays, and an L-shaped permanent magnet is preferably employed in which the pole arranged on the short leg of the magnet is opposite to the point of the armature where the flux is carried off.

Figure 2:
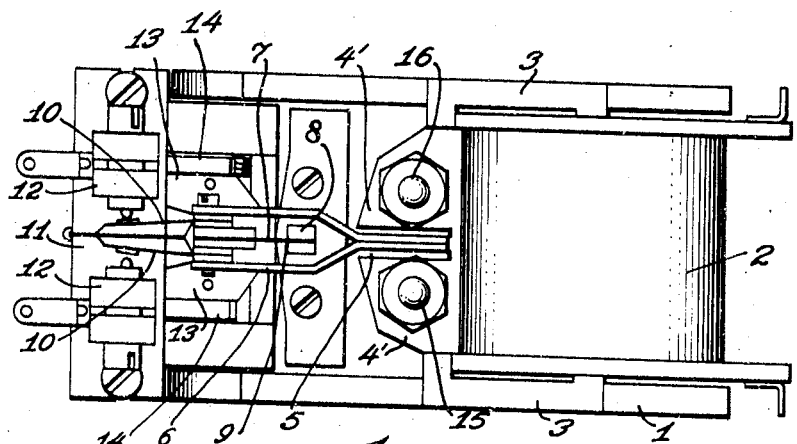

In Figs. 1 and 2 of the accompanying drawing is shown an embodiment of the invention in diagrammatic form; similar numerals denote similar parts in both views. Fig. 1 is a side elevational view of the relay according to the invention and Fig. 2 a top view thereof.

The coil 2 and the soft iron core 3 thereof are arranged within the casing frame partly broken away. The soft iron core 3 forms a closed circuit through the pole shoes 4, the air gap 5 being maintained constant. A suitable cover plate 4' made of non-magnetic material may be provided on the pole shoes as indicated on the Fig. 2. One end of the resiliently mounted armature 6 oscillates in this air gap. The armature 6 is forked, as shown in Fig. 2, and is secured to the clamping block 8 through the spring 7. 9 denotes the axis of the rotation of the armature. The two forked ends of the armature 6 extend to the left away from the soft iron pole shoes 4, and secured to this end of the armature are the contact springs 10, which contact with the stationary contacts 12 mounted on the contact block 11. Between the center of rotation 9 of the armature and the contact making end of the armature are arranged beneath the armature 6 the surfaces 13 carrying off the flux, these surfaces being formed by angular extensions of the armature. The rear side of the L-shaped polarizing permanent magnet 14 is disposed in the same plane as the bottom surface of the casing frame. The short leg of the magnet 14 denoted by the reference character S forms the south pole and is opposite to and separated by an air gap from the surface 13 of the armature 6, carrying off the flux. The long leg of the permanent magnet 14 denoted by N forms the north pole and is arranged beneath the pole shoes 4. The lower ends of the screws 15 and 16 which are made of soft iron and are imbedded in the pole shoes 4, contact with the north pole of the permanent magnet. The alternating flux forms a closed circuit through the pole shoes 4 and through the right-hand armature end which is movably arranged in the air gap 5. The permanent flux circuit extends from the north pole of the permanent magnet in two parallel paths through the screws 15 and 16 to the pole shoes 4 of the alternating flux circuit and from these pole shoes 4 to the movable armature end disposed in the air gap 5. The permanent flux forms a closed circuit through the surface 13, thus carrying off the flux at the left end of the armature at a point removed from the center of rotation or pivot point 9 thereof.

What is claimed is:

1. A polarized relay comprising a single-coil magnetic circuit for carrying fluctuating flux, an armature comprising a member which is forked at one end, spring means disposed in said forked end, mounting means forming with said spring means pivot means for rotatably mounting said armature at a point disposed between its ends, pole shoes in said fluctuating flux circuit forming an air gap for receiving one end of said armature, and a permanent magnet disposed in parallel with said armature, one end of said magnet being connected with said pole shoes and the other end being disposed adjacent the other end of said armature and separated therefrom by a constant air gap.

2. A polarized relay comprising an elongated trough-like mounting frame having a bottom plate and side walls, a magnetic system for generating fluctuating flux including a single electric coil and a core piece disposed at one end of said mounting frame and extending crosswise thereof, pole shoes forming an air gap secured to said core piece, a permanent magnet one end of which is connected with said pole shoes extending from said system lengthwise of said bottom plate substantially in the plane thereof, an armature disposed above said permanent magnet substantially in parallel therewith, one end of said armature being disposed in the air gap formed by said pole shoes and the other end thereof being forked and disposed adjacent to but separated by a constant air gap from the free end of said permanent magnet, and means for rotatably mounting said armature at a point between its ends, said last named means comprising spring means disposed within said forked end of said armature, and mounting means forming with said spring means a pivot means for said armature.

3. A polarized relay comprising a magnetic circuit carrying fluctuating flux, pole shoes in said fluctuating flux circuit forming an air gap, means forming an armature having a unitary section disposed within said air gap and having two arms extending therefrom and forming a forked section projecting away from said air gap, a mounting member disposed within said forked section and carrying spring means connected with the free ends of the two arms thereof to form a pivot for rotatably mounting said armature for movement of its unitary section within said air gap, and a permanent magnet connected at one end with said fluctuating flux circuit and projecting therefrom in parallel relation with said armature, the free end of said permanent magnet being disposed adjacent the free end of the forked section of said armature.

4. The structure and combination defined in claim 3, wherein the free end of said permanent magnet is separated from the forked section of said armature by a constant air gap.

5. The structure and combination defined in claim 3, wherein the two arms forming the forked section of said armature are provided with extensions projecting laterally therefrom and forming with the free end of said permanent magnet a constant air gap.

OTTO RÖMER.